United States Patent [19]

Suyama et al.

[11] Patent Number: 5,066,744

[45] Date of Patent: Nov. 19, 1991

[54] METHOD OF POLYMERIZING VINYL CHLORIDE

[75] Inventors: Shuji Suyama; Tomoyuki Nakamura, both of Aichi, Japan

[73] Assignee: Nippon Oil and Fats Company, Limited, Tokyo, Japan

[21] Appl. No.: 448,637

[22] Filed: Dec. 11, 1989

[30] Foreign Application Priority Data

Dec. 22, 1988 [JP] Japan .................................. 63-322154

[51] Int. Cl.$^5$ ................................................ C08F 4/38
[52] U.S. Cl. .................................. 526/228; 526/344.1
[58] Field of Search ............................. 526/228, 344.1

[56] References Cited

U.S. PATENT DOCUMENTS 4,777,191  10/1988  Komai et al. ..................... 526/228
4,914,169   4/1990  Suyama et al. ................... 526/228

*Primary Examiner*—Paul R. Michl
*Assistant Examiner*—T. McDonald, Jr.
*Attorney, Agent, or Firm*—Stevens, Davis, Miller & Mosher

[57] ABSTRACT

A polyvinyl chloride polymer or copolymer having excellent thermal resistance and being free from FEs and offensive smell can be obtained in a high yield through a polymerization reaction of vinyl chloride monomer alone or together with a vinyl monomer copolymerizable therewith by the use of a combination system polymerization initiator consisting of (A) α,α'-bis(neodecanoylperoxy)-diisopropylbenzene, and (B) at least one of peroxy ester, diacyl peroxide and peroxy dicarbonate, each of which has a 10-hour half-life period temperature within the range of 40°–65° C. in its 0.1 mol concentration solution in benzene.

1 Claim, No Drawings

METHOD OF POLYMERIZING VINYL CHLORIDE

BACKGROUND OF THE INVENTION a) Field of the Invention

This invention relates to a method of polymerizing vinyl chloride monomer alone or together with a vinyl monomer copolymerizable therewith into a polymer having excellent physical properties in a high yield by the use of a specifically limited polymerization initiator.

b) Related Art Statement

There have been used polymerization initiators, such as tertiary butylperoxy neodecanoate (hereinafter, abbreviated as BND), 3,5,5-trimethylhexanoyl peroxide (hereinafter, abbreviated as NPO), di(2-ethylhexyl) peroxy dicarbonate (hereinafter, abbreviated as OPP) and the like, each of which has a 10-hour half-life period temperature within the range of 40°-65° C. in its 0.1 mol concentration solution in benzene, in the polymerization of vinyl chloride monomer alone or together with a vinyl monomer copolymerizable therewith.

However, when these polymerization initiators are used alone, there are economical problems such that the polymerization efficiency is low unless a relatively high polymerization temperature is used, and the polymerization reaction cannot be completed unless a large amount of the polymerization initiator is used. In order to eliminate these drawbacks and to enhance the productivity of vinyl chloride homopolymer or copolymer by shortening the polymerization cycle, a polymerization initiator, such as diisobutyryl peroxide (hereinafter, abbreviated IBPO), which has a higher activity at low temperature than that of the above described conventional polymerization initiator, has been developed and used in combination with the conventional polymerization initiator (refer to Japanese Patent Application Publication No. 56-50,892).

That is, it has been attempted to carry out a constant rate polymerization reaction by the use of the above described polymerization initiator, such as IBPO or the like, in combination with the above described conventional polymerization initiator, such as BND or the like, which polymerization initiator, such as IBPO or the like, has a higher activity at low temperature than that of the conventional polymerization initiator, such as BND or the like, and is used as a rapid-active polymerization initiator capable of giving a high reaction rate in the initial stage of the polymerization reaction, and which conventional polymerization initiator, such as BND or the like, is used as a delayed-active polymerization initiator capable of giving a high reaction rate in the latter stage of the polymerization reaction.

Such rapid-active polymerization initiators include IBPO, acetylcyclohexylsulfonyl peroxide (hereinafter, abbreviated as ACSP), cumylperoxy neodecanoate (hereinafter, abbreviated as CND) and the like, each of which has a 10-hour half-life period temperature of not higher than 40° C.

Recently, a constant rate polymerization has been investigated by using a combination system of a rapid-active polymerization initiator and a delayed-active polymerization initiator, and by adjusting the amount of these initiator used. However, the conventional rapid-active polymerization initiator has not a satisfactorily high activity, and its effect for shortening the polymerization time is low even in the used together with a delayed-active polymerization initiator. Therefore, the development of a polymerization initiator having a higher activity at low temperature than that of the above described conventional rapid-active polymerization initiator has been eagerly demanded.

Further, the quality of a polymer has recently become important in addition to the high productivity, and the development of a polymerization initiator having a high activity and being able to produce a polymer having excellent physical properties is eagerly demanded.

When the above described conventional rapidactive polymerization initiator is used, the resulting polymers have not always satisfactorily excellent physical properties. For example, when a polymer obtained by a polymerization using IBPO is formed into a soft resin shaped article, a large amount of fish-eyes (hereinafter, abbreviated as FEs) are formed.

When ACSP is used, a polymer having a large amount of FEs is formed, and moreover the resulting polymer is poor in the thermal stability and discolors. When CND is used, a fairly strong offensive smell peculiar to CND is generated due to its decomposition product during the processing of the resulting polymer.

The presence of FEs deteriorates the appearance of shaped articles produced from vinyl chloride homopolymer or copolymer resin, and hence the shaped article is very low in value as a merchandise. Moreover, the offensive smell of the polymer deteriorates the working environment, and injures the health of operators. That is, the generation of offensive smell is a serious social problem.

The inventors have made various investigations for a long period of time with respect to the drawbacks of the above described conventional rapid-active polymerization initiator, and found out that, when a specifically limited polymerization initiator is used as a rapid-active polymerization initiator, a polymer can be obtained in a high yield, and further the resulting polymer is free from FEs and from offensive smell and has high thermal stability, particularly high resistance against discoloration. As the result, the present invention has been accomplished.

SUMMARY OF THE INVENTION

The feature of the present invention lies in a method of polymerizing vinyl chloride monomer alone or together with a vinyl monomer copolymerizable therewith, an improvement comprising using a combination system polymerization initiator consisting of (A) $\alpha,\alpha'$-bis(neodecanoylperoxy)-diisopropylbenzene, and (B) at least one of peroxy ester, diacyl peroxide and peroxy dicarbonate, each of which has a 10-hour half-life period temperature within the range of 40°-65° C. in its 0.1 mol concentration solution in benzene.

DESCRIPTION OF THE PREFERRED EMBODIMENTS

As the vinyl monomer, which is copolymerizable with the vinyl chloride monomer and is used in the present invention, there can be used, for example, ethylene, vinyl acetate, vinylidene chloride, styrene, acrylic acid ester and the like.

One component of the combination system polymerization initiator to be used in the present invention is $\alpha,\alpha'$-bis neodecanoylperoxy)-diisopropylbenzene The amount of $\alpha,\alpha'$-bis(neodecanoylperoxy)diisopropylbenzene use is 0.001-1 part by weight, preferably 0.01-0.5 part by weight, calculated as a pure substance, based o 100 parts by weight of the amount of vinyl chloride monomer or a mixture of vinyl chloride monomer and a vinyl monomer copolymerizable therewith. When the amount of α,α'-bis neodecanoylperoxy)-diisopropylbenzene is less than 0.001 part by weight, the polymerization velocity is low. When the amount of the peroxy compound exceeds 1 part by weight the polymerization reaction is difficult to be controlled, and the physical properties of the resulting polymer are poor. Therefore, the use of the perox compound in an amount of less than 0.001 part by weight or more than 1 part by weight is not preferable. This α,α'-bis(neodecanoylperoxy)-diisopropylbenzene can be used in the form of any of ortho-isomer, meta-isomer and para-isomer, and their mixtures. For example, α,α'-bis(neodecanoylperoxy)-diisopropylbenzene is synthesized in the following manner.

That is, ortho-, meta- or para-isopropylbenzene dihydroperoxide alone or a mixture of 2 or 3 isomers thereof is reacted with neodecanoyl chloride in the presence of a catalyst of sodium hydroxide, potassium hydroxide or an amine, such as pyridine or the like, under the same reaction condition as that in the production or ordinary peroxy esters.

That is, α,α'-bis(neodecanoylperoxy)-diisopropylbenzene can be synthesized by the use of a solvent of aromatic hydrocarbon (for example, toluene or ethylbenzene) or aliphatic hydrocarbon (for example, hexane, octane, petroleum naphtha, mineral spirit, or Shellsol (trademark, sold by Shell Chemical Co.)) and used as such in the form of the resulting reaction solution, or can be synthesized without the use of a solvent and used after diluted with a solvent. The reaction temperature in the synthesis of α,α'-bis neodecanoylperoxy)-diisopropylbenzene is about −10° C. to about 30° C.

Another component of the combination system polymerization initiator to be used in the present invention is at least one of peroxy ester, diacyl peroxide and peroxy dicarbonate, each of which has a 10-hour half-life period temperature of 40°-65° C.

Concretely speaking, the peroxy esters include BND (46.5° C.), tert.-butylperoxy neohexanoate (52.1° C.), tert.-butylperoxy pivalate (55° C.), tert.-octylperoxy neodecanoate (41° C.) and the like. The diacyl peroxides include NPO (59.5° C.), lauroyl peroxide (62° C), octanoyl peroxide (62° C) and the like. The peroxydicarbonates include OPP (43.5° C.), di(2-ethoxyethyl)-peroxy dicarbonate 43.4° C.), di-n-propylperoxy dicarbonate (40.5° C.), diisopropylperoxy dicarbonate (40.5° C.) and the like.

The addition amount of these peroxy compounds used as another component of the combination system polymerization initiator is generally ¼-4 times that of α,α'-bis(neodecanoylperoxy)-diisopropylbenzene.

The polymerization method to be used in the present invention may be the ordinary suspension polymerization method or emulsion polymerization method. The polymerization temperature is generally within the range of 20°-75° C., and is preferably within the range of 30°-60° C. When the polymerization temperature is lower than 20° C., the activity of the delayed-active polymerization initiator is low, and a long polymerization time is required. When the polymerization temperature exceeds 75° C., the life of the rapid-active polymerization initiator is short. Therefore, the use of a polymerization temperature of lower than 20° C. or higher than 75° C. is disadvantageous.

The present invention, which uses the above described specifically limited polymerization initiator, has the following merits.

A polymer can be obtained in a high yield as compared with the case wherein a conventional initiator (for example, ACSP, IBPO or CND) is used as a rapidactive polymerization initiator in a combination system polymerization initiator. Moreover, the resulting polymer has excellent physical properties. Particularly, the shaped article has a very small amount of FEs.

The following examples are given for the purpose of illustration of this invention and are not intended as limitations thereof.

SYNTHETIC EXAMPLE 1

Synthesis of
α,α'-bis(neodecanoylperoxy)-paradiisopropylbenzene

Into a four-necked flask of 500 ml capacity equipped with a stirrer and a thermometer was charged 171.7 g of a 30% aqueous solution of potassium hydroxide, and then 53.1 g of para-diisopropylbenzene dihydroperoxide having a purity of 85.2% was added to the flask under stirring while keeping the liquid temperature to 20° C. Further, a mixed solution consisting of 91.5 g of neodecanoic acid chloride and 50 g of an aliphatic hydrocarbon solvent (trademark: Shellsol 71, sold by Shell Chemical Co.) was added dropwise to the flask in 7 minutes while keeping the liquid temperature to 20° C. After completion of the addition, stirring was further continued for 1 hour while keeping the liquid temperature to 20° C., and then an aqueous phase was separated off. An oil phase was washed with 150 ml of a 5% aqueous solution of sodium hydroxide, and then washed with water three times. The resulting solution was dried over anhydrous magnesium sulfate to obtain 132.3 g of a Shellsol solution containing 59.2% of α,α'-bis(-neodecanoylperoxy) -para-diisopropylbenzene. The yield was 73.3 mol%.

SYNTHETIC EXAMPLE 2

Synthesis of
α,α'-bis(neodecanoylperoxy)-diisopropylbenzene (a
mixture of meta-isomer and para-isomer A synthesis reaction was effected in the same manner as described in Synthetic example 1, except that diisopropylbenzene dihydroperoxide (a mixture of 37% of meta-isomer and 63% of para-isomer) was used in place of para-diisopropylbenzene dihydroperoxide. As the result, there was obtained 126.8 g of a Shellsol solution containing 60.9% of α,α'-bis(neodecanoylperoxy)-diisopropylbenzene (a mixture of meta-isomer and para-isomer). The yield was 72.7 mol%.

In a stainless steel autoclave of 400 ml capacity, 0.1 part by weight of polyvinyl alcohol was dissolved in 200 ml of deionized water. Then, 0.04 part by weight, calculated as a pure substance, of α,α'-bis(neodecanoylperoxy)-para-diisopropylbenzene hereinafter abbreviated as p-NDPB), which was obtained in Synthetic example 1, was added to the autoclave, and further 0.04 part by weight, calculated as a pure substance, of BND was added to the autoclave, and then the reaction system was cooled to a temperature of −80° C. or lower, and then 100 parts by weight of vinyl chloride monomer was added to the reaction system. The empty space portion of the autoclave was fully purged with nitrogen gas, and then the autoclave was tightly sealed. The sealed autoclave was immersed in a constant temperature water tank kept at 50° C. for 6 hours to effect a polymerization reaction. The stirring was effected by rotating the autoclave in the water tank at a rate of 32 r.p.m.

After completion of the polymerization reaction, the reaction mixture was cooled, and unreacted vinyl chloride monomer was removed from the reaction mixture to obtain a white powder. The resulting white powder was washed with 100 ml of water twice, and then dried under vacuum. The yield of polyvinyl chloride calculated from the obtained polymer weight was 83%.

As the thermal stability test of the resulting polyvinyl chloride, the following discoloration test was effected, and at the same time, the offensive smell of the polyvinyl chloride was examined. Further, the number of FEs was calculated according to the following method.

The obtained results are shown in Table 1.

Discoloration test and offensive smell

A mixture of 100 parts by weight of polyvinyl chloride, 50 parts by weight of dioctyl phthalate and 2.5 parts by weight of dibutyltin maleate was kneaded for 10 minutes on a roll kept at 160° C. and formed into a sheet having a thickness of 1 mm. The discoloration of the sheet was observed by the naked eye. Further, the offensive smell of the sheet just after the sheet was taken out from the roll was examined at the same time.

The number of FEs

A mixture of 100 parts by weight of polyvinyl chloride, 50 parts by weight of dioctyl phthalate and 2.5 parts by weight of dibutyltin maleate was kneaded for 7 minutes on a roll kept at 160° C., and formed into a sheet having a thickness of 0.1 mm. The number of FEs, which were present in the area of 10 cm×10 cm of the sheet, was calculated by the naked eye.

EXAMPLE 2

Vinyl chloride monomer was polymerized according to Example 1, except that a mixture of meta-isomer and para-isomer of α,α'-bis(neodecanoylperoxy)-diisopropylbenzene (hereinafter abbreviated as NDPB) was used in place of p-NDPB as one component of the polymerization initiator, as illustrated in Table 1.

EXAMPLES 3 and 4

Vinyl chloride monomer was polymerized according to Example 2, except that NPO or OPP was used in place of BND as one component of the polymerization initiator, as illustrated in Table 1.

COMPARATIVE EXAMPLES 1-3

Vinyl chloride monomer was polymerized according to Example 1, except that a conventional polymerization initiator of IBPO, ACSP or CND was used in lace of P-NDPB as one component of the polymerization initiator, as illustrated in Table 1.

The results obtained in Example 2, in Examples 3 and 4, and in Comparative examples 1-3 are shown in Table 1 together with the result obtained in Example 1.

TABLE 1

|  |  | Example | | | | Comparative example | | |
| --- | --- | --- | --- | --- | --- | --- | --- | --- |
|  |  | 1 | 2 | 3 | 4 | 1 | 2 | 3 |
| Vinyl chloride monomer (parts by weight) | | 100 | 100 | 100 | 100 | 100 | 100 | 100 |
| Addition[1] amount of initiator (part by weight) | p-NDPB | 0.04 | | | | | | |
| | NDPB | | 0.04 | 0.04 | 0.04 | | | |
| | BND | 0.04 | 0.04 | | | 0.04 | 0.04 | 0.04 |
| | NPO | | | 0.04 | | | | |
| | OPP | | | | 0.04 | | | |
| | IBPO | | | | | 0.04 | | |
| | ACSP | | | | | | 0.04 | |
| | CND | | | | | | | 0.04 |
| Yield (%)[2] | | 83 | 84 | 81 | 85 | 73 | 71 | 78 |
| Discoloration | | colorless | colorless | colorless | colorless | colorless | light red | colorless |
| Offensive smell | | no | no | no | no | no | no | slight offensive smell[3] |
| FEs (number) | | 0 | 0 | 1 | 0 | 23 | 26 | 7 |

Note:
[1] calculated as a pure substance (parts by weight)
[2] polymerization temperature: 50° C., and polymerization time: 6 hours
[3] slight offensive smell resembling to acetophenon or phenol It can be seen from Table 1 that, in a combination system polymerization initiator consisting of a rapid-active polymerization initiator and a delayed-active polymerization initiator, in the case where a common delayed-active polymerization initiator is used, when a conventional polymerization initiator (IBPO, ACSP or CND) is used as a rapid-active polymerization initiator, the resulting polymer has a large amount of FEs, has offensive smell, and further is poor in the heat resistance (in the resistance against discoloration). On the contrary, when a specifically limited rapid-active polymerization initiator according to the present invention is used, a polymer having excellent physical properties can be obtained in a high yield.

What is claimed is:

1. In a method of polymerizing vinyl chloride monomer alone or together with a vinyl monomer copolymerizable therewith, an improvement comprising using a combination system polymerization initiator consisting of
   (A) α,α'-bis(neodecanoylperoxy)-diisopropylbenzene, and
   (B) at least one of peroxy ester, diacyl peroxide and peroxy dicarbonate, each of which has a 10-hour half-life period temperature within the range of 40°-60° C. in its 0.1 concentration solution in benzene,
   wherein the polymerization temperature is within the range of more than 30° C. but less than 60° C., component (A) is present in an amount of 0.001-1 part by weight based on 100 parts by weight of the vinyl chloride monomer alone or together with the vinyl monomer copolymerizable therewith, and component (B) is present in an amount ¼-4 times that of component (A).

* * * * *